C. V. FITE.
MANUALLY PORTABLE SAWING MACHINE.
APPLICATION FILED JAN. 20, 1919.

1,395,101.

Patented Oct. 25, 1921.
3 SHEETS—SHEET 1.

C. V. FITE.
MANUALLY PORTABLE SAWING MACHINE.
APPLICATION FILED JAN. 20, 1919.
1,395,101.
Patented Oct. 25, 1921.
3 SHEETS—SHEET 3.
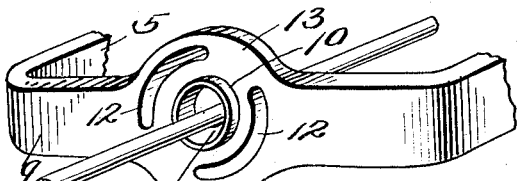
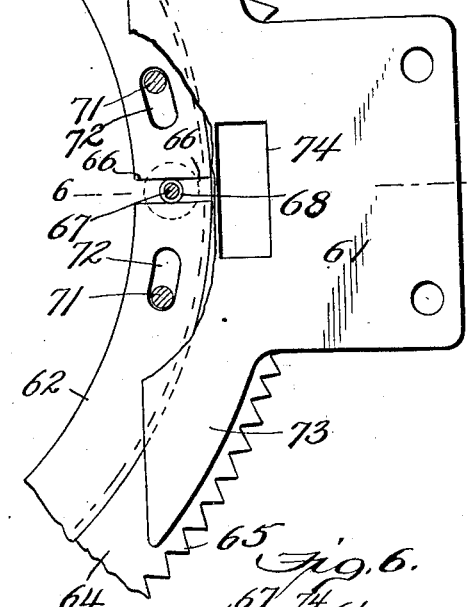
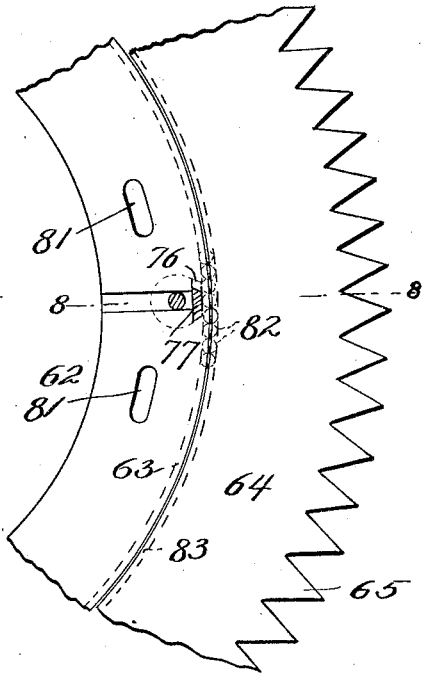
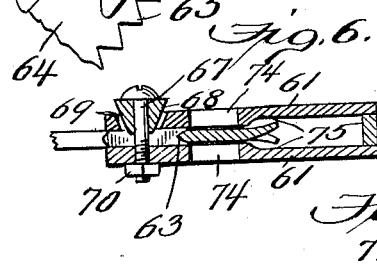
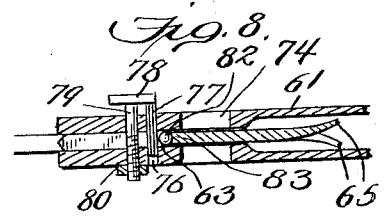
Witnesses
C. D. Kesler
Chas. S. Hoyer.
Inventor
Cephas V. Fite
by
James L. Norris,
Attorney

UNITED STATES PATENT OFFICE.

CEPHAS V. FITE, OF CHARLOTTE, NORTH CAROLINA.

MANUALLY-PORTABLE SAWING-MACHINE.

1,395,101.   Specification of Letters Patent.   Patented Oct. 25, 1921.

Application filed January 20, 1919. Serial No. 272,037.

*To all whom it may concern:*

Be it known that I, CEPHAS V. FITE, a citizen of the United States, residing at Charlotte, in the county of Mecklenburg and State of North Carolina, have invented new and useful Improvements in Manually-Portable Sawing-Machines, of which the following is a specification.

This invention relates to a portable motor saw particularly adapted for cutting down and cutting up rough trees or timber though generally usable in cutting all sorts of dressed or partially dressed timber into suitable lengths. The primary object of the invention is to provide a manually portable motor saw which is complete in itself, may be readily transported from one place to another, and wherein the saw or cutting member may be disposed at varying angles to adapt the same for cutting down trees, trimming felled trees, or cutting trees up into predetermined lengths in an expeditious and effective manner. A further object of the invention is to provide a saw of the type specified having structural features which will render it readily adjustable, easy running, and generally positive in operation to adapt the same to work of different kinds. A still further object of the invention is to produce a manually portable saw embodying a motor and mechanism between the motor and the saw which is operative to concentrate a maximum power on the saw and to rotate the latter at high speed, and also to so position and mount the saw that it will have a maximum cutting exposure and a rapid penetrating action.

With these and other objects and advantages in view, the invention consists in the construction and arrangement of the several parts which will be more fully hereinafter described and claimed in preferred form.

In the drawings:

Fig. 3 is a detail perspective view of one of the friction operating devices for the saw and the flexible mounting therefor.

Fig. 4 is a detail perspective view of a portion of the saw frame and the drive shaft loosely extending therethrough.

Fig. 5 is an enlarged detail elevation, partially broken away and in section, of a portion of the saw and supporting means therefor, and particularly illustrating one form of means for adjusting the ring bearing for the saw.

Fig. 6 is a section taken in the plane of the line 6—6, Fig. 5.

Fig. 7 is an enlarged detail elevation showing a portion of the saw and the ring bearing therefor and the adjusting means for the latter in section and embodying a modified structure.

Fig. 8 is a section taken in the plane of the line 8—8, Fig. 7.

Fig. 9 is a detail perspective view of part of the modified adjusting means shown by Figs. 7 and 8.

Figure 1:
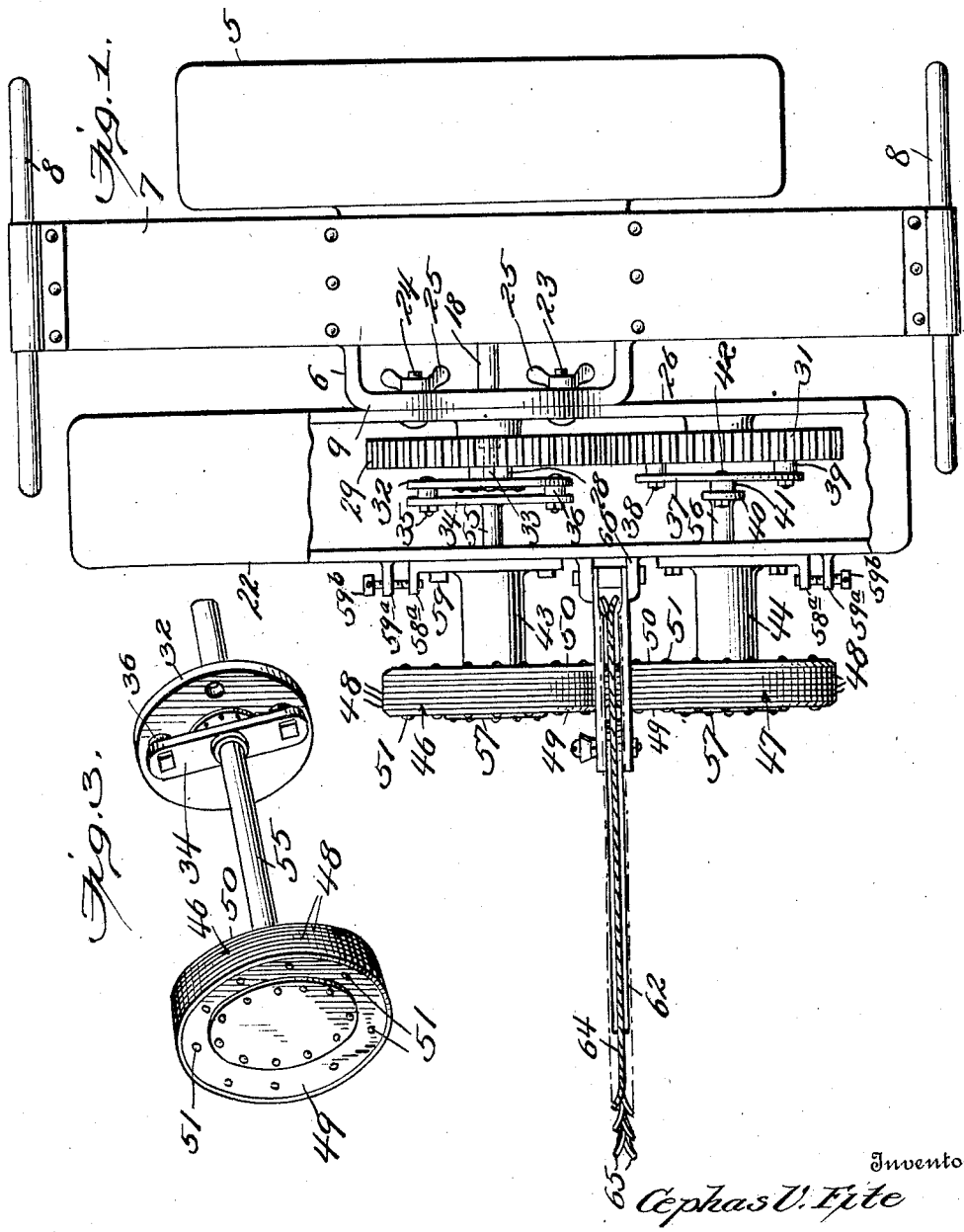
Figure 1 is a top plan view, partially broken away, of a saw embodying the features of the invention.

The numeral 5 designates a motor casing of suitable dimensions and located at the rear of the saw organization, said casing having a forwardly projecting, centrally located supporting frame 6 to the top of which a hand-lift or transporting member 7 is secured and provided at its opposite ends with hand-bars or grips 8. The transporting member has considerable width and thickness to give it sufficient strength to sustain the weight of the saw organization during transportation and to facilitate also the application of the saw to the work without liability of the said member becoming fractured or broken, this member 7 being preferably in such position as to effect a balancing control of the entire saw organization but is wholly in advance of the motor casing 5. The forwardly projecting frame 6 includes a front or transverse face bar 9 with a central hub 10 encircling an enlarged central opening 11. At opposite sides of the hub 10 and in proper relative position are segmental slots 12, as shown by Fig. 4, the center 13 of the transverse bar 9 being enlarged in disk form to accommodate the formation of the segmental slots 12, the latter being concentric with the opening 11.

Figure 2:
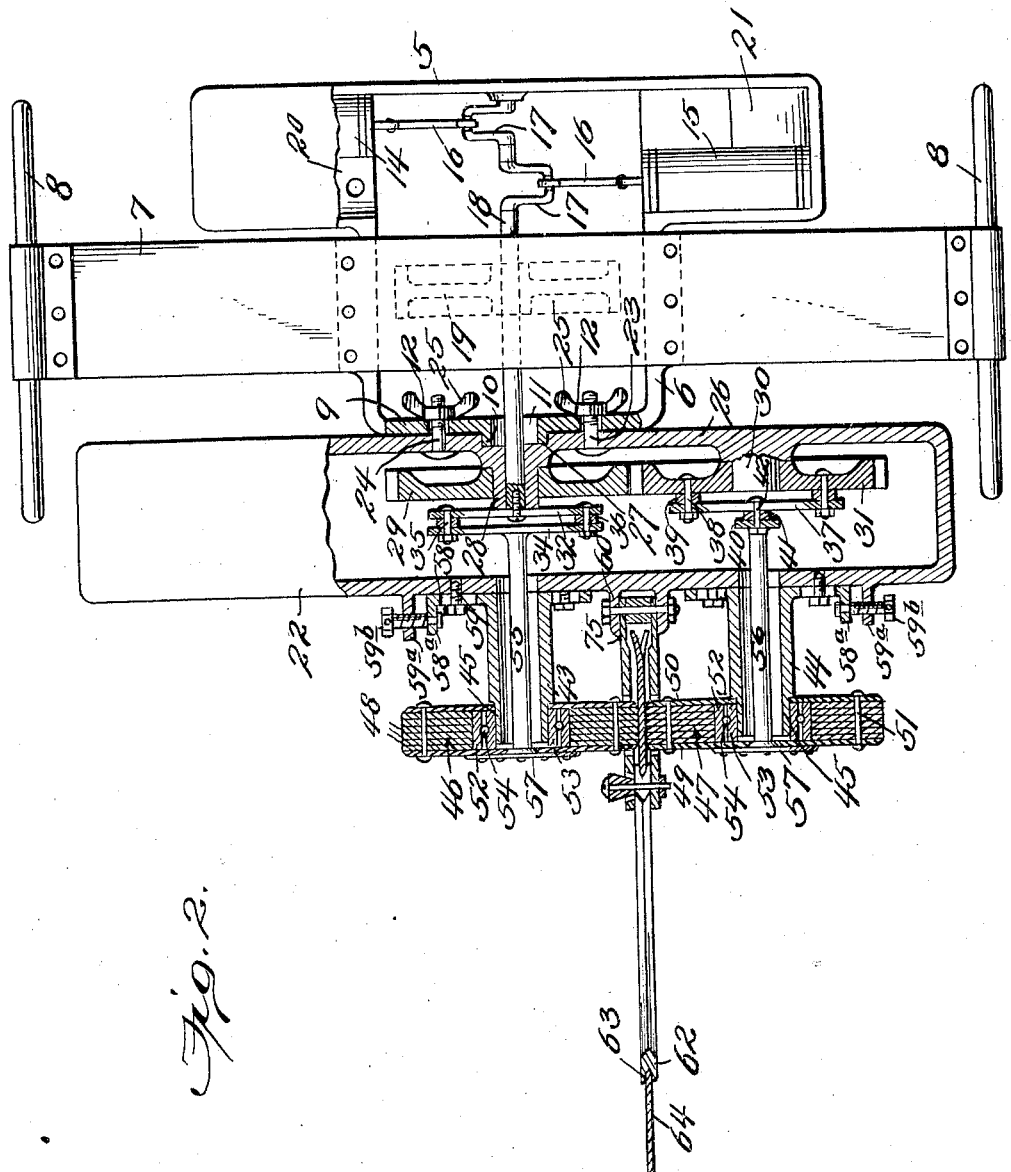
Fig. 2 is a view similar to Fig. 1 and, in addition, illustrating the saw supporting means for directly operating the latter in horizontal section.

The preferred form of motor as shown is of the internal combustion type and embodies two opposed cylinders 14 and 15 with their piston rods connected by links or analogous devices 16 to oppositely positioned cranks 17 of a drive shaft 18 which projects forwardly through the opening 11 and having thereon between the transverse bar 9 and the front of the casing 5 a balancing or fly-wheel 19, as shown by dotted lines in Fig. 2. By means of the opposing positions of the cylinders 14 and 15 and the connection of their piston rods to the cranks 17, the shaft 18 is positively operated at a high rate of speed in a regular and efficient manner. On the top of the inclosure 5 a suitable fuel tank 20 is applied and also a magneto 21, the fuel tank being connected up to the cylinders 14 and 15 after the manner of the usual form of internal combustion engines, and the magneto 21 controlling the sparks of the plugs, with which the cylinders 14 and 15 will be equipped, at such intervals as to set up a practical operation of the pistons of the cylinders to operate the shaft 18. As above stated, this form of motor is preferred in view of its economy and easy management, but it will be understood that any type of motor adapted for the purpose may be employed, it being only necessary in support of the effectiveness of the improved sawing organization to utilize a motor that will regularly and positively drive the shaft 18.

Adjustably connected to the transverse bar 9 of the forwardly projecting motor frame 6 is a saw supporting and adjusting means which consists of an elongated adjustable frame 22 wherein the operating gears and connections for the shafts of the friction drive devices for the saw are inclosed and shielded as well as protected, it being desirable in the construction of the improved saw organization to inclose all of the parts as much as possible to avoid contact therewith and to obviate the collection of saw-dust and dirt or grit thereon. The frame 22 is provided with a pair of headed bolts 23 and 24 which are adjustably mounted in the slots 12 and provided with wing nuts 25 engaging their rear screw-threaded extremities and adapted to bear with a clamping action against the rear or inner side of the transverse bar 9 to maintain the frame 22 and the parts carried thereby in the position desired. The rear wall 26 of the frame 22 is formed with a central socket 27 of a depth to receive the hub 10 and whereby a pivotal connection is provided so that the said frame 22 or the saw frame and saw accessories may be readily swung in opposite directions to vary the angle of the saw and then fixed through the medium of the bolts 23 and 24 and the nuts 25. It will also be understood that the saw supporting means, consisting mainly of the frame 22 will, under normal sawing conditions, be held in a true horizontal plane. In line with the socket 27 and extending forwardly into the frame 22 from the rear wall 26 of the latter is a tubular bearing 28 through which the shaft 18 projects, said shaft passing centrally through the opening 11 of the bar 9 and entirely clearing the wall of said opening, and on the tubular bearing 28 a gear 29 is mounted to freely rotate. At a suitable distance from the tubular bearing 28, the rear wall 26 also has a stub bearing 30 projecting therefrom on which a gear 31 has free rotation, said gear 31 being held in continual mesh with the gear 29. Secured to the end of the shaft 18 exposed at the forward end of the tubular bearing 28 is a connecting disk or head 32 which in turn is bolted or secured to the gear 29 as shown by Fig. 1, bolts 33 being used as the connecting means and one of said bolts being illustrated. It is obvious that as many of these bolts 33 may be used as found necessary. The disk or head 32 is of flexible material, and diametrically extending over the front face thereof is a connecting bar 34 which is attached to the disk or head by suitable bolts 35, space washers 36 being introduced between the ends of the connecting bar 34 and the disk or head 32 so as to permit the latter to flex sufficiently for a purpose which will be presently explained. It will be seen that the shaft 18 rotates the disk 32 and the latter in turn rotates the gear 29 through the fastening bolts 33 introduced between the said disk or head 32 and this gear. To the gear 31 a similar disk or head 37 of flexible material is secured by bolts 38, space washers 39 being introduced at the points of attachment of the disk or head to the gear and whereby the disk 37 will be permitted to freely yield or flex. Across the center of the disk or head 37 a connecting bar 40 extends and is in all respects similar to the bar 34 heretofore described and is held in spaced relation to the disk or head by connecting bolts and interposed washers 41 and 42. Extending forwardly from the front wall of the frame 22 are elongated tubular bearings 43 and 44, each of said bearings having an outer reduced end 54. On the outer reduced ends of these bearings 43 and 44, friction wheels or rollers 46 and 47 are respectively mounted, and each comprises a disk body 48 composed of a suitable number of layers of frictional material secured in fixed relation by outer and inner plates 49 and 50 connected by bolts 51 extending through the layers. It is preferred that these layers of material be of a nature as to set up a strong frictional action at their peripheries relatively to the saw that is to be driven thereby, and each disk body 48 includes an inner hard metal ring or hub 52 and over the reduced end of each tubular bearing 43 and 44 is a hard metal ring 53, anti-frictional balls 54 being introduced in suitable races formed in the rings 52 and 53 and whereby the frictional drive wheels or rollers are given an anti-frictional rotative movement relatively to the outer ends of the bearings 43 and 44. Shafts 55 and 56 respectively extend from the connecting bars 34 and 40 and through the tubular bearings 43 and 44, said shafts being of materially less diameter than the latter bearings and free to be adjusted at angles. The outer ends of the shafts 55 and 56 are respectively secured to the outer central portions of the friction wheels or rollers 46 and 47 by means of center plates 57 secured to the outer plates 49. The tubular bearings 43 and 44 are adjustable against the outer wall or side of the frame 22 through the medium of outer slotted flanges 58 at the inner ends of the bearings, and bolts 59 engaging the slots and the front wall of the frame 22. The ends of the flanges 58 terminate in angle members 58$^a$ adjacent to lugs 59$^a$ projecting outwardly from the front wall of the frame 22, the said angle members and lugs being engaged by adjusting screws 59$^b$ readily operative to shift the bearings 43 and 44 as may be necessary. The outer flanges 58 at the inner portions of the bearings 43 and 44 are shorter than the outer parts of said flanges so as to permit the adjustment of these bearings inwardly without restriction by the inner narrower portions of the flanges. When the bearings 43 and 44 are adjusted inwardly, the shafts 55 and 56 are deflected from straight lines owing to the flexible couplings for the said flanges relatively to the shaft 18 and gears 29 and 31. This adjustment of the bearings 43 and 44 is to compensate for wear of the friction wheels or rollers 46 and 47 and whereby a tight frictional engagement of the peripheries of said rollers may always be maintained against opposite portions of the saw. It will be seen that the square contact of the peripheries of the rollers 46 and 47 with the saw will not be varied by the adjustment of the bearings 43 and 44 owing to the fact that the said friction wheels or rollers are held on the outer reduced extremities 45 of the said bearings, and the angularity of the latter relatively to the outer wall or side of the frame 22 is never varied. The layers of frictional material comprised in the formation of the disk body 48 may be made of leather or other composite material and when worn to such an extent by continued use as to fail to fulfil the desirable frictional contact thereof with the saw may be replaced by similar layers of material by first removing the friction wheels or rollers from the bearings, or other similar friction wheels or rollers may be substituted for those that have become worn.

Between the bearings 43 and 44 a bifurcated bracket 60 projects forwardly from the outer or front wall of the inclosure 22, and bolted thereto are bracket plates 61 which are secured at their outer ends to a saw ring bearing 62. The ring bearing 62 is formed with a peripheral groove 63 to rotatably receive the inner peripheral portion of an annular saw 64 having outer teeth 65. The ring bearing 62, as shown by Fig. 5, is split or cut, as at 66, and between the ends thereof a threaded bolt 67 is inserted, carrying a conical spreader or wedge 68 adapted to engage a conical opening 69 at the center of one bracket plate 61 and also the contiguous end edges of the ring bearing 62, the screw bolt 67 passing through the center of the opposite plate 61, as shown by Fig. 6, and suitably nutted. The spreader or conical wedge 68 is drawn in between the end edges of the ring bearing 62 by tightening the bolt 67 through its nut 70, and by this means the said ring bearing will be spread or expanded as may be found desirable or necessary to sustain the annular saw 64 in true working relation relatively to the bearing but at the same time permit the saw to freely rotate around the bearing. The ring bearing 62 also has studs or bolts 71 projecting through suitable slots 72 formed in said bearing in the extremities thereof at a suitable distance from the end edges, the studs or bolts 71 being fitted to and engaging the bracket plates 61. By this means the expanding and contracting operations of the ring bearing 62 are rendered regular and at the same time said bearing is given an additional support in the bracket plates. The bracket plates 61 at their outer ends have extensions 73 which serve as braces or retention devices to strengthen the saw and ring bearing, though the saw 64 is permitted to freely rotate between all parts of the bracket plates. The bracket plates 61 are further provided with slots 74, one in each, for the projection therethrough of the inner opposing peripheries of the friction wheels or rollers 46 and 47 and to permit engagement of the said friction wheels or rollers with the opposite sides of the annular saw 64. Adjacent to the bifurcated bracket 60, the plates 61 are reduced in thickness, as at 75, to compensate for the set of the teeth of the saw and to permit the latter to run freely without striking the inner opposing sides of the plates. The bracket plates 61 are held in proper spaced relation at their inner ends through the medium of space washers or collars fitted over the bolts used for securing the said plates to the bifurcated bracket 60. It will be understood that the ring bearing 62 will be of softer metal than the annular saw 64, and hence there will be more or less wear in the groove 63 of the bearing, and the adjusting means just described including the bolt 67 and the spreader 68 may be readily set to compensate for the wear or to expand the bearing ring proportionately to such wear and thereby at all times readily maintain a practical operative relation between the saw frame and the ring bearing.

Figs. 7, 8 and 9 illustrate a modification in the construction of the means for adjusting the ring bearing 62 and also for setting up an anti-frictional engagement of the saw with the said bearing. In this modified construction, the ends of the ring bearing adjacent to the inner periphery of the saw are each formed with a wedge slot 76 which slots combine to form a wedge-shaped opening for an expanding wedge 77 constructed as a part of the head 78 of the screw-threaded adjusting bolt 79 which is also provided with a nut 80. As the nut 80 is turned on the bolt 79, a straight sliding action is given to the bolt and the wedge 77, and by this means the ring bearing 62 is expanded to tighten the same relatively to the saw 64. The plates 61 in this instance have slots 81 therein similar in contour to the expanding wedge 77 in addition to the opening for the bolt 79, as clearly shown by Fig. 8. The bearing 62 is also formed with a peripheral groove 63 similar to the groove heretofore described but deeper than that shown by Figs. 2 and 6 and adapted to receive anti-frictional balls 82, the inner peripheral edge of the saw 64 being grooved, as at 83, to form with the groove 63 a raceway for the said balls. By means of the introduction of these balls between the saw 64 and the ring bearing 62, the movement of the saw is rendered very sensitive and wear on the ring bearing and saw is reduced to a minimum.

From the foregoing description, the operation will be readily understood but may be briefly summarized as follows: When the cylinders 14 and 15 of the motor are rendered active, the shaft 18 is regularly driven and directly drives the shaft 55 and indirectly operates the gear 29, the latter in turn rotating the gear 31 in the proper direction to actuate the shaft 56 and whereby the two friction wheels or rollers 46 and 47 will, by their contact with opposite sides of the saw 64, set up a rapid rotation of the latter around the ring bearing 62. It will be observed that the saw 64 is projected a considerable distance clear of the saw supporting means and the greater portion thereof is exposed for cutting through logs with advantage in sawing logs of considerable diameter, and it will be understood that, in practice, the saw 64 and ring 62 will have a combined diameter of such dimension as to render the improved saw as a whole operative in cutting logs or trees of very large diameter. At any time found necessary the saw frame consisting essentially of the frame 22 may be adjusted on the transverse bar 9 so as to dispose the saw 64 and ring bearing 62 at different angles, or, said parts may be adjusted so as to arrange the saw and its ring bearing in a horizontal position or in a plane at right angles to that shown by Figs. 1 and 2. It will be seen that the ring bearing 62 has a thickness less than the set of the saw teeth 65 and as a consequence the saw kerf formed in cutting a tree or log will be of greater width than the said ring and the latter will be permitted to readily enter the kerf formed and thereby give the saw and its ring bearing a greater range of cutting action or permit the saw with the ring bearing to penetrate the log or tree cut by the saw. The saw 64 may be readily detached from the ring bearing 62 for sharpening and other purposes, and in the event of excessive wear is capable of being replaced by another similar annular saw blade. It may also be desirable at times to replace the saw 64 by another having a different tool set to adapt the machine in the performance of different sawing operations. In applying the saw it will be understood that the operator grasps the hand-bars or holding devices 8 and thereby lifts the saw organization as a whole into proper position for application to the work and said hand-bars will also be used in transporting the saw from one place to another.

Among many advantages of the improved motor saw organization is its compactness and the combination therewith of the power means for driving the saw and which will enable the use of the improved device in forests or dense tree growths at a distance from power sources and facilitate cutting down trees and severing the cut trees or timber into suitable lengths for convenience in transportation.

What is claimed is:

1. In a manually portable sawing machine, a motor frame having a motor carried thereby, a saw supporting frame having saw operating mechanism driven by said motor, and a rotary saw projecting forwardly from the saw supporting frame and having its greater portion clear of the supporting means therefor to permit unobstructed cutting movement thereof through a log, the rotary saw being shiftable to varying angular positions relatively to the supporting frame therefor, and means extending across a portion of the motor frame in rear of the saw supporting frame and provided with devices at opposite ends for permitting a manual grasp and portability and balancing of the complete machine and for holding the saw to its work.

2. In a manually portable sawing machine, a motor frame carrying motor means and a shaft projecting therefrom operated by said means, a saw supporting frame directly and adjustably applied to a portion of the motor supporting frame and adjustable around and clear of direct engagement with the said shaft and having saw operating mechanism therein in direct actuating association with the said shaft, a part of the saw operating means projecting in advance of the saw supporting frame, an annular device held fixed by the saw supporting frame, and a rotary saw held by and rotatable around the outer periphery of said annular device and projecting outwardly from the front portion of the saw supporting frame and operatively controlled at opposite sides by the part of the saw operating mechanism projecting in advance of the saw supporting frame.

3. In a manually portable sawing machine, a motor frame carrying motor means and a shaft projecting therefrom operated by said motor means, a saw supporting frame directly and adjustably applied to a portion of the motor supporting frame and movable around the said shaft, the saw supporting frame carrying saw operating mechanism directly associated with the said shaft and comprising saw operating means and a fixed annular device projected in advance of the said supporting frame, and a rotary saw carried by the front and projecting in advance of the said supporting frame and rotatably mounted on said fixed annular device, the saw being engaged at opposite sides by said operating means for giving the saw a clearance for movement through a log.

4. A manually portable sawing machine comprising a motor carrying means and motor and a saw supporting frame having saw operating means actuated by the motor, the saw supporting frame being adjustable relatively to the motor carrying means and having saw operating devices projecting in advance thereof and a fixed annular saw support, and an annular rotary saw held by and rotatable on said annular saw support and projected in advance of the front of the said supporting frame and engaged at opposite sides by the said devices for giving the saw a maximum clearance to permit it to pass through a log without obstruction.

5. A manually portable sawing machine comprising a motor carrying means, a saw supporting frame adjustably associated with the motor carrying means and having saw operating mechanism therein and devices standing in advance thereof and forming a part of said mechanism and including a fixed annular saw support, and an annular rotary saw held by and rotatable on and around said annular saw support and projected forwardly beyond the said frame and frictionally engaged at opposite sides by said devices for driving the saw.

6. A manually portable sawing machine, comprising a motor frame with motor means therein and a drive shaft projecting outwardly from and operated by said motor means, a saw-supporting frame including a fixed annular saw support in advance of said frame, the latter frame having saw actuating mechanism therein associated with said shaft and also provided with forwardly projecting simultaneously reversely driven motion transmitting shafts operatively connected to and driven by said saw actuating mechanism, frictional rollers on the forward extremities of the said reversely driven shafts and also in advance of the supporting frame, and a rotary annular saw held by and rotatable on and around said annular saw support and projecting in advance of the saw supporting frame, the said frictional rollers being individually connected to and positively rotated by the said motion transmitting shafts and engaging opposite sides of the saw in advance of the saw supporting frame, the saw being projected in advance of the supporting frame and the friction rollers for movement through a log.

7. In a manually portable sawing machine, a frame carrying motor means including a drive shaft projecting therefrom, a saw supporting frame having saw actuating devices operated by the said shaft and including forwardly projecting reversely operating motion transmitting shafts with flexible couplings between the same and said actuating devices, a ring frame held fixed by and projecting in advance of the front of the saw supporting frame, a rotary saw mounted on the said ring frame, and frictional rollers on the forward ends of the said transmitting shafts engaging opposite sides of the saw and mounted for adjustment to compensate for wear.

8. In a manually portable sawing machine, a motor means, a saw supporting frame adjustably held by a portion of the motor means and having saw actuating devices therein including forwardly projecting positively driven and reversely rotatable adjustable motion transmitting shafts, a ring frame held by and projecting in advance of the front portion of the saw supporting frame, a saw mounted on and rotating around the ring frame and having the greater portion thereof projecting in advance of the saw supporting frame for maximum cutting exposure, and frictional rollers connected to said motion transmitting shafts and bearing against opposite sides of the saw in advance of the saw supporting frame.

9. In a manually portable sawing machine, a motor means including a frame and a drive shaft freely projecting through the frame, a saw supporting frame held against and rotatable in relation to a portion of the said motor means frame, the said shaft extending into the saw supporting frame, reversely actuated motion transmitting shafts projecting forwardly through and in advance of the front of the said saw supporting frame, continuously meshing gear devices within the saw supporting frame, one of said gear devices being mounted on the forwardly projecting drive shaft, flexible connections between the motion transmitting shafts and said gear devices, the motion transmitting shafts being adjustable through the medium of the flexible connections therefor, supporting means held fixed in advance of the saw supporting frame between the said motion transmitting shafts, a rotary saw mounted to move on the said latter supporting means and having the greater portion thereof clear in advance of the saw supporting frame, and frictional rollers on the forward ends of the motion transmitting shafts and engaging opposite sides of the saw to rotate the latter.

10. In a manually portable sawing machine, a motor means including a forwardly projecting frame having a transverse bar with a central opening and segmental slots concentric with said opening, a forwardly projecting hub also being formed on said bar around the central opening, a drive shaft extending from the motor means through the said central opening and hub, a saw supporting means into which the said drive shaft extends, adjusting bolts and nuts engaging the rear portion of the saw supporting means and coöperating with the segmental slots in the transverse bar, meshing mechanism in the saw supporting means having motion transmitting shafts connected thereto, a part of said mechanism being secured to the drive shaft, a saw held by and projecting in advance of the saw supporting means, tubular bearings secured to the front portion of the saw supporting means on opposite sides of the saw and through which the motion transmitting shafts loosely extend, and frictional rollers connected to the forward ends of the motion transmitting shafts and engaging opposite sides of the saw for driving the latter, the tubular bearings being adjustable to compensate for the wear on the frictional rollers and also to move the motion transmitting shafts without modifying the square engagement of the rollers with the saw.

11. In a manually portable sawing machine, a motor means including a frame, a saw supporting frame adjustably connected to a part of the frame of the motor means, a drive shaft extending from the motor means into the saw supporting frame, intermeshing gear devices within the saw supporting frame, one of the gear devices being connected to the said drive shaft, forwardly extending motion transmitting shafts having flexible couplings to the gear devices for adjusting said transmitting shafts, bearing devices projecting forwardly from the front of the saw supporting frame and adjustable on the latter frame independently of the said motion transmitting shafts, the latter shafts extending through said adjustable bearing means, a fixed saw supporting means held by and projecting in advance of the saw supporting frame, an annular saw mounted on and rotatable around the said fixed saw supporting means, and frictional rollers mounted on the said bearings and connected to the outer end of the said motion transmitting shafts, the said rollers engaging opposite sides of the saw.

12. In a manually portable sawing machine, the combination with a saw driving mechanism, of a fixed bearing ring projected in front and standing clear of the said driving mechanism and having a grooved periphery, an annular saw rotatably mounted on the said ring within the grooved periphery of the latter, means for expanding the ring within the saw, and devices for driving the saw on the ring.

13. In a manually portable sawing machine, a motor means and saw operating devices actuated thereby, a fixed ring held at the front and in advance of the saw operating devices and motor means, the fixed ring having means for controlling the expansion and contraction thereof, an annular saw mounted to rotate on the periphery of the ring, and means engaging opposite sides of the saw for rotating the latter.

14. In a manually portable sawing machine, a split ring bearing held in fixed position, means operative between the ends of the said bearing to control the expansion and contraction of the latter, an annular saw rotatably mounted on the said ring, and means for rotating the saw.

15. In a manually portable sawing machine, a fixed split bearing ring, a saw rotatably mounted on the peripheral portion of the ring, and means engaging the ends of the ring and including a wedge device for expanding and contracting said ring relatively to the interior of the saw.

16. In a manually portable sawing machine, a fixed split bearing ring having a grooved periphery, an annular saw mounted to rotate on the grooved periphery of the ring, anti-frictional balls between the periphery of the ring and the adjacent inner edge of the saw, means for engaging the ends of the ring for controlling the expansion and contraction of the latter within the saw, and means for operating the saw.

In testimony whereof I have hereunto set my hand in presence of two subscribing witnesses.

CEPHAS V. FITE.

Witnesses:
Q. A. FITE,
SELMA LATHAW.